(12) United States Patent
Kim et al.

(10) Patent No.: US 6,503,595 B1
(45) Date of Patent: Jan. 7, 2003

(54) CARPET HAVING SYNDIOTACTIC POLYPROPYLENE BACKING AND TECHNIQUE FOR MAKING SAME

(75) Inventors: Sehyun Kim, Murrysville, PA (US); Sharon Jones Elliott, Albuquerque, NM (US)

(73) Assignee: Aristech Chemical Company, Pittsburgh, PA (US)

( * ) Notice: Subject to any disclaimer, the term of this patent is extended or adjusted under 35 U.S.C. 154(b) by 0 days.

(21) Appl. No.: 09/507,997

(22) Filed: Feb. 22, 2000

(51) Int. Cl.[7] .................. B32B 27/04; B32B 27/12; B05D 3/00
(52) U.S. Cl. ............... 428/97; 428/95; 428/96; 428/523; 427/374.4; 427/389.9
(58) Field of Search ............... 428/97, 96, 95, 428/523; 427/374.4, 389.9

(56) References Cited

U.S. PATENT DOCUMENTS

| | | | |
|---|---|---|---|
| 3,953,632 A | 4/1976 | Robinson | 428/95 |
| 4,191,798 A | 3/1980 | Schumacker et al. | 428/95 |
| 4,438,228 A | 3/1984 | Schenck | 524/109 |
| 4,508,771 A | 4/1985 | Peoples, Jr. et al. | 428/95 |
| 4,579,764 A | 4/1986 | Peoples, Jr. et al. | 428/95 |
| 4,673,604 A | 6/1987 | Frain, III et al. | 428/95 |
| 5,221,394 A | 6/1993 | Epple et al. | 156/230 |
| 5,240,530 A | 8/1993 | Fink | 156/94 |
| 5,317,070 A | * | 5/1994 | Brant et al. | 526/348.5 |
| 5,474,829 A | 12/1995 | Woosley | 428/88 |
| 5,728,444 A | 3/1998 | Fink | 428/97 |
| 5,876,827 A | 3/1999 | Fink et al. | 428/95 |
| 5,919,864 A | * | 7/1999 | Watanabe et al. | 525/166 |
| 2002/0065371 A1 | * | 5/2002 | Fujii et al. | 525/240 |

FOREIGN PATENT DOCUMENTS

| | | | |
|---|---|---|---|
| EP | 650 818 | * | 5/1995 |
| WO | WO 96/29460 | * | 9/1996 |

* cited by examiner

*Primary Examiner*—Cheryl A. Juska
(74) *Attorney, Agent, or Firm*—Roberts Abokhair & Mardula, LLC

(57) ABSTRACT

The disclosure relates to a carpet, a process for manufacturing a carpet and a method for recycling a carpet. The carpet of the present disclosure includes a primary backing having tufts of synthetic carpet fibers protruding from a top surface and, optionally, a secondary backing, with an extruded sheet of a polyolefin polymer composition between and integrally fused to a bottom surface of the primary backing and an upper surface of the secondary backing. The extruded sheet polymer composition comprises at least 10%, preferably, at least 20% by weight of a syndiotactic polypropylene product. The extruded sheet polymer composition may further comprise less than 40% by weight of an impact modifier. The process for manufacturing the recyclable carpet includes contacting the extruded sheet with the primary backing and, optionally, the secondary backing, at a temperature sufficiently high to integrally fuse the extruded sheet to the respective backing. The extruded sheet provides excelled adhesion and abrasion properties.

15 Claims, No Drawings

CARPET HAVING SYNDIOTACTIC POLYPROPYLENE BACKING AND TECHNIQUE FOR MAKING SAME

BACKGROUND OF THE INVENTION

The present invention relates to carpet backing compositions. More particularly, the present invention relates to extruded carpet backing materials used to provide a durable, highly flexible carpet backing capable of being thermoformed. Still more particularly, the present invention relates to carpet constructions, preferably including a tuft, means, such as a scrim, for retaining the tuft, and an extruded thermoplastic barrier coating as the carpet backing therefor.

While carpets are generally manufactured by a number of methods, processes such as tufting and needle punching have become quite popular in the last few years. In particular, the majority of carpeting manufactured today is produced by the tufting process. Tufted carpets are composite structures in which the face fiber forming the pile, i.e., the surface of the carpet, is needled through a primary backing and the base of each tuft extends through the primary backing and is exposed on the bottom surface of the primary backing.

The basic manufacturing approach to the commercial production of tufted carpeting is to start with a woven scrim or primary carpet backing and to feed this into a tufting machine or a loom. The carpet face fiber is needled through and embedded in the primary carpet backing thus forming a tufted base or griege goods. Griege goods are typically backed with an adhesive coating in order to secure the face fiber to the primary backing. In order to reduce costs, some carpet often receives only a latex adhesive coating as the backing. Higher cost carpet often receives both a secondary backing and a latex adhesive coating.

The application of the latex adhesive coating involves preparing griege goods by stitching a primary carpet backing material with face fiber in a manner so as to form on the top surface of the material a pile composed of numerous closely spaced, up-standing loops of yarn. Thereafter, the bottom surface of the thus formed griege goods is coated with a latex polymer binder such as a styrene-butadiene copolymer. The coated griege goods are then passed through an oven to dry the latex adhesive coating to bond the face fibers to the primary backing which causes the bonding of and which is the principal reason for adding the latex binder.

In another method, such tufted carpets have been manufactured by processes which generally comprise composite structures in which tufts, or bundles of carpet fibers are introduced (such as by stitching) into a primary backing or scrim, such as a woven or non-woven fabric. A secondary backing or coating of thermoplastic material is then applied to the underside of the carpet construction in order to securely retain the tufted material in the primary backing. This secondary backing not only dimensionally stabilizes this construction but also provides greater abrasion and wear resistance, and serves as the adhesive for the barrier coating.

The face fiber or yarn used in forming the pile of a tufted carpet is typically made of any one of a number of types of fiber, such as nylon, acrylics, polypropylene, polyethylene, polyamides, polyesters, wool, cotton, rayon and the like.

Primary backings for tufted pile carpets are typically woven or non-woven fabrics made of one or more natural or synthetic fibers or yarns, such as jute, wool, polypropylene, polyethylene, polyamides, polyesters, and rayon. Films of synthetic materials, such as polypropylene, polyethylene and ethylene-propylene copolymers may also be used to form the primary backing.

Likewise, secondary backings for tufted pile carpets are typically woven or non-woven fabrics made of one or more natural or synthetic fibers or yarns. Preferably, secondary backings for tufted pile carpets are open weave or leno weave, i.e., tape yarn in the warp direction and spun staple fiber in the fill direction. The spun staple fiber is more costly but desirable to increase adhesion between the backing and the latex adhesive.

Another commercially important carpet manufacturing process is needle punching. In this process the carpet fibers are punched by a series of barbed needles, which causes them to mechanically interlock and form a non-woven loose fabric structure. In the known processes, the problem of fiber loss is always present. In most cases, a back coating is employed to reduce fiber loss and to also provide dimensional stability and body. The problem of such fiber loss is particularly acute in connection with automotive carpeting where wear is generally concentrated into limited areas. Automotive carpet is subjected to sliding and other forces, which have resulted in excessive fiber loss therein.

The method utilizing a latex polymer binder for making carpet is used in 80 to 90% of all carpet made in the United States. This carpet-making method has disadvantages in that it requires a drying step and thus an oven to dry the latex polymer binder. The drying step increases the cost of the carpet and limits production speed. Furthermore, it has recently been reported that latex adhesive compositions may generate gases that may be the cause of headaches, watery eyes, breathing difficulties and nausea, especially when used in tightly sealed buildings. See Herligy, The Carpet & Rug Industry, October 1990. In addition, overheating of the carpet may occur during drying of the latex, which in turn may affect the shade, or color of the carpet.

Consequently, carpet manufacturers have been attempting to develop a new approach for the preparation of tufted carpets. One new approach is the preparation of tufted carpets with a hot-melt adhesive composition instead of a latex composition.

Hot-melt adhesives are amorphous polymers that soften and flow sufficiently to wet and penetrate the backing surfaces and tuft stitches of carpets upon application of sufficient heat. Furthermore, hot-melt adhesives tend to adhere to the backing surfaces and/or tuft stitches. That is, hot-melt adhesives stick to backing surfaces and tuft stitches.

By the use of hot-melt adhesive, the necessity of drying the composition after application is eliminated and further, when a secondary backing material is desired, it can be applied directly after the hot-melt composition is applied with no necessity for a drying step.

Application of a hot-melt composition is generally accomplished by passing the bottom surface of the griege goods over an applicator roll positioned in a reservoir containing the hot-melt composition in a molten state. A blade is ordinarily employed to control the amount of adhesive which is transferred from the application roll to the bottom surface of the structure. After application of the hot-melt composition to the bottom surface of the griege goods, and prior to cooling, the secondary backing, if desired, is brought into contact with the bottom surface, and the resulting structure is then passed through nip rolls and heated.

The activation temperature of a hot-melt adhesive, i.e., the temperature at which the adhesive softens and flows sufficiently to wet and penetrate the backing surfaces and tuft stitches, is below the temperature at which the backing and face yarns melt or otherwise distort. Otherwise, the backing and face yarns may suffer other damage due to heating.

Hot-melt adhesives also must have low enough viscosities at temperatures employed in finishing to achieve good wetting of the backings and sufficient encapsulation of tuft stitches to make the tuft yarns resistant to pull-out, pilling and fuzzing. In addition, for commercial practice, economics of a carpet manufacturing process utilizing hot-melt adhesive must be at least as good as those of conventional latex lamination techniques which remain the dominant lamination process in commercial carpet manufacture.

A number of hot-melt adhesives and processes using the hot-melt adhesive have been proposed for use in carpet lamination. For example, U.S. Pat. No. 3,551,231, issued Dec. 29, 1970 to Smedberg, discloses a hot-melt adhesive carpet lamination process in which molten adhesive consisting of an ethylene-vinyl acetate copolymer and, optionally, waxes (e.g., microcrystalline and polyethylene waxes), fillers (e.g., calcium carbonate), resin extenders (e.g., dicyclopentadiene alkylation polymers) and antioxidant is applied to a tufted primary backing and then a secondary backing is contacted with the molten adhesive under pressure after which the assembly is cooled to solidify the adhesive.

U.S. Pat. No. 3,583,936, issued Jun. 8, 1971 to Stahl, discloses a hot-melt adhesive for tufted carpet lamination comprising about 10–35 weight percent ethylene copolymer comprising about 60–85 weight percent ethylene, and about 15–40 weight percent lower vinyl ester, acrylate or methacrylate; about 10–25 weight percent wax, such as microcrystalline petroleum, polyolefin, or paraffin wax having a melting point sufficient to give an adhesive composition with a softening point greater than 190.degree. F.; and about 50–70 weight percent resin extender composed of a base resin prepared from reactive olefins and diene monomers of 5–7 carbons.

The hot-melt compositions are selected for their adhesive properties. That is, the hot-melt composition may be selected for their suitability in adhering the tufts of face yarn to the primary backing and to adhere the secondary backing to the primary backing. Such compositions are generally amorphous or substantially non-crystalline due to the adhesive properties of such polymers.

For example, U.S. Pat. No. 3,982,051, issued Sep. 21, 1976 to Taft et al., discloses a carpet containing a hot-melt composition of ethylene copolymer, atactic polypropylene and vulcanized rubber. The atactic, substantially non-crystalline, polypropylene used in the hot-melt composition may be obtained as a by-product from the preparation of substantially crystalline, isotactic, polypropylene. Atactic polypropylene is particularly suitable as a hot-melt composition due to its adhesive nature whereas isotactic polypropylene is not particularly suitable as a hot-melt composition due to its lack of adhesive properties.

While the hot-melt compositions and processes heretofore known are considerably simpler than the latex process, the preparation of carpets of non-uniform quality has, at times, been encountered. Specifically, such carpets using hot-melt adhesives cannot, with reproducible consistency, be prepared with high scrim bonds (force required to remove the secondary backing from the finished carpet), high tuft pull strength (force required to pull one of the tufts out of the carpet), and high fuzz resistance (an indication of the individual carpet yarns to fuzz and form pills). Thus, while such hot-melt compositions are appealing from a standpoint of cost, speed and safety, some difficulties have been encountered in preparing completely satisfactory carpet. See U.S. Pat. No. 3,551,231, issued Dec. 29, 1970 to Smedberg.

Thus, conventional carpet and carpet manufacturing processes have inherent problems including the compositions employed therein. Specifically, the adhesives used to adhere the tufts of face fiber to the primary backing and to adhere the secondary backing to the primary backing include compositions which require lengthy drying times. Drying adds costs and slows down the manufacturing process. In addition, the latex compositions may produce noxious off-gases that create health hazards. Likewise, many of the hot-melt compositions conventionally employed in the manufacture of carpet do not result in reproducible consistency regarding scrim bonds, tuft pull strength and fuzz resistance. Finally, and most importantly, the use of conventional latex adhesives and hot-melt adhesives prevent carpet from being recycled.

As an improvement over the previously used coatings as the secondary carpet backing, and in an attempt to provide a sound and thermal barrier in connection with automotive carpeting, attempts have been made to apply various thermoplastic resin layers to carpeting. U.S. Pat. No. 3,525,662, for example, teaches the use of a coating of thermoplastic material comprising a mixture of polyolefin and low viscosity saturated hydrocarbon such as petroleum wax. The patentee claims that this inclusion of low viscosity material increases the speed of processing as well as the wear characteristics of his final carpet product, which is said to be particularly intended for use in automotive carpeting.

Subsequently, Collins and Aikman Corporation developed a calcium carbonate-loaded ethylene/vinyl acetate copolymer system which had many desirable properties for use in such systems. U.S. Pat. No. 3,551,231 discloses the application of a hot melt adhesive blend of ethylene/vinyl ester copolymer, petroleum wax, and a thermoplastic resin, in this case in conjunction with the application of a critical degree of pressure on the tufted structure during contact with the adhesive applicator roll.

Further developments in connection with secondary carpet backings include that in U.S. Pat. No. 3,390,035, which discloses the use of a molten thermoplastic adhesive material including an ethylene/vinyl acetate copolymer, wax, and optionally a thermoplastic resin other than the ethylene copolymer.

In U.S. Pat. No. 3,684,600 a low viscosity pre-coated adhesive is disclosed for application to the backside of a tufted carpet structure prior to the application of the hot melt adhesive. The backside adhesive disclosed in that patent again contains ethylene/vinyl ester copolymer, in this case along with low molecular weight, low-density polyethylene, microcrystalline wax, aliphatic thermoplastic hydrocarbon resin, dicyclopentadiene alkylation polymer, antioxidant, and filler.

Similar such compositions are disclosed in U.S. Pat. Nos. 3,583,936 and 3,745,054, and improvements on these compositions are alleged to be included in U.S. Pat. No. 3,914,489 which discloses such carpet backings including ethylene/vinyl ester copolymer, a hydrocarbon resin having a prescribed softening point and viscosity, and optionally also low molecular weight ethylene homopolymer, paraffin wax, antioxidant, and filler.

U.S. Pat. No. 3,982,051 discloses yet another carpet hot melt composition, in this case including ethylene/vinyl acetate copolymer, atactic polypropylene, and vulcanized rubber.

Neither the latex adhesive based carpet nor the hot-melt adhesive based carpet may be easily recycled. Thus, large quantities of carpet trimmings and scrap, produced during the manufacture of carpet, and used carpet are sent to landfills. Consequently, carpet manufacturers spend a substantial sum on landfill costs.

Other patents teach the use of extruded carpet backing in automotive applications. These patents are directed to providing a form and insulation for the carpet. U.S. Pat. No. 4,508,771 to Peoples, Jr. et al., issued on Apr. 2, 1985 is directed to such a carpet backing composition. U.S. Pat. No. 5,876,827 to Fink et al., issued on Mar. 2, 1999 is directed to pile carpet, which may be recycled, and methods of manufacturing such. U.S. Pat. No. 5,221,394 to Epple et al., issued on Jun. 22, 1993 is directed to a method for manufacturing backed, pressure-adherent industrial carpeting. U.S. Pat. No. 5,240,530 to Fink, issued on Aug. 31, 1993 is also related to the same area. U.S. Pat. No. 5,474,829 to Woosley, issued on Dec. 2, 1995 also provides some background information. For the purposes of the U.S. prosecution only, these patents are incorporated herein by reference in their entirety.

In one particular process for the manufacture of automotive carpets, nylon fibers are tufted into a PET (polyethylene terephthalate) non-woven sheet. An LDPE (low density polyethylene) is used to pre-coat carpet backing via extrusion. In some applications where pre-colored nylon fibers are utilized, LDPE has proven to be less than satisfactory in this application. Since "Nylon 6,6" has been replaced by "Nylon 6", LDPE has started showing poor performance, for example, poor abrasion resistance and weak adhesion. Carpet manufacturers have been getting such claims from auto manufacturers that fibers have been pulled off more easily from the carpet installed in the vehicle when a driver rubs his or her feet against the carpet. These complaints were attributed to the poor performance of LDPE as the adhesive layer. When Nylon 6,6 is used in the carpet, a dying process is required. The dying process includes subjecting the carpet to washing and drying processes, thus providing "loosened" fiber face to be coated with polymer melt. Hence, washed and dried fibers facilitate carpet backing, such as LDPE melt, to easily penetrate into the fiber face. Thus, high MFR has been a major requirement for the pre-coating material.

However, Nylon 6 is pre-colored and thus, does not require a dying process. Therefore, the washing and drying steps are not included and the fibers exposed from the primary (PET) backing may be too tight for the polymer melt to penetrate. The high MFR is not the required property any more. In order to qualify as a pre-coating material, new materials with better-defined requirements have been sought. The crystallization kinetics of polymer melt applied to the carpet fiber became a critical factor as compared to the MFR.

Accordingly, there is a need for carpet backing compositions that show acceptable properties in this application. The formulation needs to provide a sheet of material that completely "wets" the carpet backing when applied through extrusion. This includes improved performance in both MFR and crystallization properties. Additionally, the sheet should result in acceptable abrasion and adhesion properties.

From the above background, it is quite apparent that there is need in the art for an improved carpet and method for producing carpet as well as a method for recycling carpet.

SUMMARY OF THE INVENTION

The present invention relates to an improved carpet, method for producing a carpet and method for producing a secondary carpet backing that overcomes many of the problems associated with conventional carpet and carpet manufacturing processes.

Specifically, a carpet is disclosed having at least a primary backing, tufts of carpet fibers protruding from a top surface of the primary backing, a secondary backing of an extruded sheet integrally fused to the primary backing.

Also disclosed is a process for manufacturing automotive carpet including at least contacting a bottom surface of a primary backing having tufts of carpet fibers protruding from its top surface with an extruded sheet of thermoplastic polyolefin polymers and modifiers, at a temperature sufficiently high to integrally fuse the extruded sheet to the bottom surface of the primary backing.

Another object of the present invention is to provide a process for manufacturing a carpet having a primary backing, tufts of carpet fibers protruding from a top surface of the primary backing, and a secondary backing integrally fused to a bottom surface of the primary backing. The secondary backing comprises at least 10% syndiotactic polypropylene.

In another embodiment of the present invention, the carpet backing composition comprises (a) from about 50–80% by weight of a polypropylene homopolymer or copolymer, (b) not less than 10% by weight syndiotactic polypropylene, and (c) not greater than 35% by weight impact modifier.

In a preferred mode, this carpet backing composition has a melt flow rate of at least 150 grams/10 min. at 230° C. Most preferably, the composition has a melt flow rate of about 300 grams/10 min. at 230° C.

These and other objects and features will be apparent from the detailed descriptive material that follows.

DETAILED DESCRIPTION OF THE INVENTION

The following is a detailed description of the various preferred embodiments of the carpet and methods for making the carpet backing. There are several key properties required for the pre-coat material. They include MFR, flexibility and crystallization characteristics.

The flexibility is measured by flexural modulus on the extruded sheet or injection molded bars. These tests are not necessarily representative of flexibility of coated carpet because the coating is only 1–2 mil. However, flexural modulus indicates some degree of flexibility of thin film. The flexibility is estimated by flexing coated carpet by hand and rating in comparison to LDPE.

In Taber abrasion test, a specimen is ground against the wheel for specified cycles. The amount of weight loss of the sample after the cycles is measured. For coated carpet, the carpet face is ground against the wheel. The less weight lost, caused by pulling fibers from the pre-coat, means better adhesion of fiber to the pre-coat.

In one embodiment, the pre-coating is applied to the carpet backing from the top via vertical extruder, thus forming a "curtain" of polymer melt when extruded. Since the manufacturers operate the pre-coatings at high speeds and want increased production rates, the extruders are run at relatively hot temperatures (500–550° F.). The high MFR occasionally causes breakage of a "curtain" due to low melt viscosity, producing poorly coated carpet or resulting in a production interruption. Thus, a material having an optimum melt viscosity or lower MFR than coating grade LDPE (200–250 MI @190° C.) is preferred. The production preference for lower melt flow material is a conflicting requirement when compared to the need for higher melt flow material for improving the coating of the carpet face yarn.

In copolymers of propylene, both random and heterophasic (impact), the flexibility is improved with the higher content of ethylene in the copolymer. Thus polypropylene copolymers, random or impact, are preferred. To further improve flexibility, other additives such as Flexomer®, are employed in the formulations. In general, useful impact modifiers have low density (<0.89 grams per cubic centimeter), low flexural modulus and low hardness value (Shore D<40). Useful impact modifiers are shown in Table II below.

It has been discovered that the crystallization rate of the pre-coat material is important. Slower crystallization rates for the pre-coat are preferred. The slower crystallization rates improve the probability of polymer melt getting into the fibers. Syndiotactic polypropylene exhibits such slower crystallization rates.

A carpet of the present invention includes at least a primary backing having tufts of carpet fibers protruding from a top surface of the primary backing and an extruded sheet comprising a thermoplastic polyolefin polymer integrally fused to the bottom surface of the primary backing. Optionally, the carpet may contain one or more secondary backings the first of which is also fused to the extruded sheet of thermoplastic polyolefin polymer.

In one embodiment of the present invention, a carpet comprises a primary backing made of woven fibers, tufts of carpet face fibers protruding from a top surface of the primary backing, and an extruded sheet comprising a thermoplastic polyolefin polymer integrally fused to the bottom surface of the primary backing. The fibers making up the primary backing are actually fused to the extruded sheet at fused portions. The fused portions between the bottom surface of the primary backing and the extruded sheet is a result of a heat bond between the primary backing and the extruded sheet during the manufacturing process. Likewise, there is a mechanical bond between the primary backing and the extruded sheet and between the face fiber and the extruded sheet resulting from the thermoplastic polyolefin polymer flowing between and around the fibers making up the primary backing and the face fibers.

The tufts of carpet face fibers may also form a heat bond with the extruded sheet. Further, the spaces between the primary backing and the extruded sheet may be larger or smaller depending on the penetration of the extruded sheet into the primary backing during manufacture. In fact, the extruded sheet may more or less conform to the shape of the bottom surface of the primary backing. Thus, there may be little, if any, space between the extruded sheet and the primary backing.

The extruded sheet is integrally fused to the primary backing. In addition, the extruded sheet is integrally fused to the face fibers and to the secondary backing. Thus, there is both a heat bond and a mechanical bond between the primary backing and the extruded sheet, between the face fibers and the extruded sheet, and between the secondary backing and the extruded sheet.

In another embodiment of the present invention, the carpet comprises a primary backing made of woven fibers, tufts of carpet face fibers protruding from a top surface of the primary backing, a secondary backing made of woven fibers and, between the primary backing and secondary backing, an extruded sheet comprising a thermoplastic polyolefin polymer. Noise reduction layers may also be added to the layers of the subject carpet. This is particularly useful in automotive carpet for engine and road noise reduction.

In another embodiment of the present invention, the carpet comprises a primary backing made of woven fibers, tufts of synthetic carpet face fibers protruding from a top surface of the primary backing, and an extruded sheet of a thermoplastic polyolefin polymer integrally fused to the bottom surface of the primary backing. Additionally, a coextruded layer of a thermoplastic polyolefin elastomer may be fused to the bottom surface of the extruded sheet.

Various embodiments of the tufted carpet of the present disclosure are currently contemplated. Each embodiment includes at least a primary backing having tufts of carpet fibers protruding from a top surface of the primary backing and an extruded sheet of a thermoplastic polyolefin polymer integrally fused to the bottom surface of the primary backing.

One preferred embodiment of the carpet of the present disclosure comprises a primary backing having tufts of synthetic carpet fibers protruding from a top surface of the primary backing and an extruded sheet comprising a blend of a thermoplastic polyolefin polymer and a thermoplastic elastomer.

Another preferred embodiment of the carpet of the present disclosure comprises fibers of a thermoplastic polyolefin polymer, such as isotactic polypropylene, which is tufted into a primary backing layer and a co-extruded layer containing a blend of thermoplastic polyolefin polymer, such as polypropylene, and thermoplastic elastomer. Blending of the polypropylene with the elastomer provides some of the properties of the elastomer such as flexibility, non-skid character and other properties similar to rubber at a cost lower than that which would be required if the entire extruded or coextruded thermoplastic layer contained the elastomer.

Another preferred embodiment of the carpet of the present invention comprises a thermoplastic polyolefin polymer layer which is integrally fused with the primary backing layer, and optionally, a secondary backing layer which is integrally fused with the thermoplastic polyolefin polymer wherein each of the face fibers, primary backing, thermoplastic polyolefin polymer layer, and secondary layer comprise the same thermoplastic polyolefin polymer. Preferably, the thermoplastic polyolefin polymer is a polypropylene polymer.

Another preferred embodiment of the carpet of the present disclosure comprises a thermoplastic polyolefin polymer layer which is integrally fused with the primary backing layer, and optionally, a secondary backing layer which is integrally fused with the thermoplastic polyolefin polymer wherein each of the primary backing, thermoplastic polyolefin polymer layer, and secondary layer comprise the same thermoplastic polyolefin polymer and wherein the face fibers comprise a different polymer. Most preferably, the thermoplastic polyolefin polymer is a polypropylene polymer and the face fibers are nylon or polyester.

Another preferred embodiment of the carpet of the present disclosure comprises an extruded thermoplastic polyolefin polymer sheet which is integrally fused with the primary backing layer, with a secondary backing layer which is integrally fused to the thermoplastic polyolefin polymer sheet.

In each of the above embodiments, the extruded layer may form a heat bond and fuse to at least portions of the primary backing, secondary backing, or face fiber. In such a case, the surface of at least one of the layers will melt, even very slightly, and flow together with the extruded material. In addition, the extruded sheet may provide a mechanical bond by penetration of the extruded layer into the primary backing, tufts of face fiber and/or secondary backing.

Other embodiments of the carpet of the present invention may include a third backing applied to the underside of the secondary backing. Such third backing could contain a blend of a polyolefin polymer and a thermoplastic elastomer such that it provides the desired characteristics such as shape retention or non-slip on the undersurface of the carpet.

The tufts of fiber protruding from the top surface of the primary backing layer may be of any of the conventionally used fibers or yarns for tufting carpet. Such materials preferably include nylon, polyester and polypropylene. However, such materials could include any of the natural or synthetic fibers known by those skilled in the art. Most preferably, the fibers are made of a synthetic resin material such as nylon, polyester or polypropylene. Even more preferably, the fibers protruding from the primary backing are made of the same material as the primary backing itself.

The primary backing may include any synthetic resin that will integrally fuse with the extruded sheet and may be, for example, a woven or non-woven fabric, a film or a web. Preferably, the primary backing is made of a thermoplastic polyolefin polymer, copolymer or terpolymer. More preferably, the primary backing is made of thermoplastic polyolefin polymer. Most preferably, the primary backing is made of polypropylene polymer or PET.

In addition, the secondary backing material, if applied, may include any synthetic resin that will integrally fuse with the extruded sheet. Preferably, the secondary backing comprises the same thermoplastic polyolefin polymer, copolymer or terpolymer as the primary backing. Optionally, the secondary backing for the carpets of the present disclosure is a woven or non-woven fabric. Likewise, the secondary backing may be an open weave or leno weave, i.e., tape yarn in the warp direction and spun staple fiber in the fill direction. However, the open weave is not necessary to obtain a suitable bond as required with use of a latex adhesive. Thus, the cost of the carpets of the present invention may be reduced by using a less costly secondary backing, if any.

The extruded sheet of thermoplastic polyolefin polymer is obtained by feeding a stock material to an extruder and extruding the stock material at relatively high temperatures to form a thin sheet through a die at a temperature sufficiently high to integrally fuse the extruded sheet to the primary backing, face fiber, secondary backing or any combination of the primary backing, face fiber or secondary backing. In order to obtain the desired fusion, it is preferred to use a thermoplastic polyolefin polymer, copolymer or terpolymer composition. A preferred thermoplastic polyolefin polymer is thermoplastic composition comprising syndiotactic polypropylene homopolymer.

In addition to homopolymer, other classes of polypropylene are commercially available and may be suitable for use in the extruded sheet. These include polypropylene random copolymers, impact or block copolymers, and terpolymers.

The polypropylene homopolymer, copolymer or terpolymer may be polymerized from propylene using various types of transition metal/organometallic catalyst systems. With proper formulation of the catalyst system, a high degree of stereoseleotivity may be obtained causing the propylene to polymerize to an ordered syndiotactic configuration in which a large proportion of the methyl appendages branching from the polymer backbone are aligned in opposite direction. The polymer may be a commercial syndiotactic polypropylene which is polymerized to a 70 to 95% syndiotactic content, with the remaining polymer being in the randomly ordered atactic or isotactic configuration. Various syndiotactic polypropylene products are available from Fina Oil and Chemical Company.

Syndiotactic polypropylene is suitable for use in the extruded layer since it has a relatively specific melting point (about 330° F. for the example shown in Table I) and a relatively specific recrystallization temperature (about 300° F. for the example shown in Table I). Atactic or amorphous polypropylene has no specific melting or recrystallization point. Thus, amorphous polypropylene is difficult to integrally fuse to the primary backing, face fibers, or secondary backing. Furthermore, the tensile strength of the syndiotactic polypropylene is approximately 28 to 40 times stronger than the tensile strength of the atactic polypropylene. Thus, the extruded sheet does not require the presence of atactic polyolefin to provide the requisite bond strength between the primary backing, tufts of face fiber or secondary backing. In addition, due to the tensile strength of the syndiotactic polyolefin, carpets with increased delamination strength may be made.

The syndiotactic polypropylene or other olefin used in the extruded layer may be compounded with inert fillers by either extrusion compounding or intensive mixing operations. Such fillers may include calcium carbonate, silicates, talc, calcium, glass fibers, carbon black and woodflour. Other fillers may be suitable.

The use of such fillers in the extrusion layer may range from about 0.1% to as high as about 50%. At the high levels, an exceedingly stiff board like material may be made that may be used, e.g., as a trunk liner, molded floor mat or a door panel in an automobile. Since addition of filler significantly alters the performance and processibility of the polymer, filled systems may be designed to satisfy a particular product need with minimum effect on other performance aspects.

Optionally, blends of polyolefins and thermoplastic elastomers may be used to make the extruded sheet or coextruded layer. The thermoplastic elastomers (TPE's) are a diverse family of rubber-like materials that, unlike vulcanized rubbers, may be processed and recycled as thermoplastics. However, the TPE's are not merely substitutes for thermosetting polymers, they may also replace or improve their properties when blended with them. There are four general groups of TPE's that may be suitable for use in the present invention. The four general groups include polyurethanes, copolyesters, styrenic block copolymers, and polyolefins. Blending the elastomer with the polyolefin polymer provides some of the properties of the elastomer at a lower cost. The compatibility is good for blends ranging from about 10 to about 97% elastomer based on the total amount of thermoplastic polymer and elastomer. Preferred elastomers include EPR, EPDM, SBS, SEBS and the like.

As a class, the TPE's may provide toughness, flexibility over a wide temperature range, and resistance to abrasion, weathering, and a variety of solvents and other chemicals. Thus, the properties of each of the materials in the group may be tailored for use in the carpet of the present invention by polymerization methods, blending, and incorporation of additives, fillers, and reinforcements to form carpets having enhanced abrasion, weathering and chemical resistance.

The thickness of the extruded layer will depend on several factors including the particular thermoplastic polyolefins polymer used, the primary backing, the face fiber and the temperature of the extrudate. For most purposes, an extruded layer of from about 0.5 to about 20 mils is satisfactory. Preferably, the extruded layer is from about 1 to about 15 mils. In instances where the carpet is made without a secondary backing layer, the extruded thermoplastic layer may serve the dual purpose of binding the tufts to the primary backing and providing a durable undersurface. In such cases, it may be desirable to use a thicker extruded layer than would otherwise be necessary. For example, a carpet of the present disclosure containing a secondary backing may include an extruded thermoplastic sheet having a thickness of 1 to 7 mils whereas a tufted carpet of the present disclosure not containing a secondary backing may include an extruded sheet having a thickness of 8 to 15 mils.

The carpet of the present disclosure is prepared by feeding a primary carpet backing into a conventional tufting machine. During the tufting process, carpet face yarn is also fed into the tufting machine wherein hundreds of individual tufting needles may be employed to stitch through the primary carpet backing thus forming a continuous web of face fiber tufted through the primary backing. At this point, the carpet face fiber is secured to the backing to a degree sufficient for movement of the tufted material for further processing, but not sufficient for its use as a finished carpet. The tufted goods removed from the tufting machine are called griege goods.

The griege goods taken from the tufting machine are finished to make the material suitable for finished carpet. This is accomplished by applying the extruded sheet of polyolefin polymer composition to the underside of the griege goods at a temperature sufficiently high as to create a heat bond between the primary backing layer, carpet face fiber and the extruded sheet. A temperature sufficiently high to create a heat bond is a temperature at least equal to the melting temperature of the polymer. More preferably, a temperature sufficiently high to create a bond is a temperature at least about 100° F. higher than the melting point of the polymer, even more preferably at least about 125° F. higher than the melting point of the polymer, and even more preferably at least about 150° F. higher than the melting point of the polymer. For example, for syndiotactic polypropylene, a preferred temperature is at least about 450° F., more preferably at least about 475° F., even more preferably at least about 500° F. Of course, temperatures too high may result in unwanted degradation of the polymers.

A carpet of the present invention comprising a primary backing having tufts of synthetic carpet fibers protruding from a top surface of the primary backing and an extruded sheet comprising a thermoplastic polyolefin polymer integrally fused to the primary backing may be prepared by introducing the griege goods with face fibers facing downward between a nip roll and a casting roll and simultaneously forcing an extrudate through a die to form an extruded sheet. The extruded sheet is introduced between the casting roll and the griege goods at a point near the nip roll which acts to urge the griege goods together with the extruded sheet.

A carpet of the present invention comprising a primary backing having tufts of synthetic carpet fibers protruding from a top surface of the primary backing, a secondary backing and an extruded sheet comprising a thermoplastic polyolefin polymer between and integrally fused to both the primary backing and the secondary backing may be prepared by introducing the griege goods with face fibers facing downward between a nip roll and a casting roll and simultaneously forcing an extrudate through a die to form an extruded sheet. The extruded sheet is introduced between the secondary backing and the griege goods at a point near the nip roll, which acts to urge the griege goods together with the extruded sheet and the secondary backing against the casting roll.

A carpet of the present invention comprising a primary backing having tufts of synthetic carpet fibers protruding from a top surface of the primary backing, an extruded sheet of a thermoplastic polyolefin polymer integrally fused to the bottom surface of the primary backing, and a coextruded layer of a thermoplastic polyolefin elastomer fused to the bottom surface of the extruded sheet may be prepared by introducing the griege goods with face fibers facing downward between a nip roll and a casting roll and simultaneously forcing an extrudate through a die to form an extruded sheet. The extruded sheet is introduced between the coextruded layer, which is also prepared by forcing an extrudate through a die, and the griege goods at a point near the nip roll which acts to urge the griege goods together with the extruded sheet and the coextruded layer against the casting roll.

Alternatively, a carpet containing an extruded sheet of a thermoplastic polyolefin polymer and a coextruded layer of a thermoplastic polyolefin elastomer fused to the bottom surface of the extruded sheet may be prepared, by simultaneously forcing extrudate through a single die designed to combine extrudate with extrudate such that a laminate containing extruded sheet and coextruded layer is obtained.

The extruded polymer may be contained in an extruder of any conventional or desired construction adapted to force the molten polymer through the die at the desired speed.

The compositions were tested using a sheetline (10-inch width) with a 1.25 inch Killion single screw extruder, equipped with an adjustable Chippewa Valley die. Once 20-mil thick sheet was lined out, a sheet of carpet was co-fed to the rolls in order for the polymer melt to be coated on the back of the carpet. The extruders were operated at general extrusion conditions: 375–450° F. extruder temperature and 450–500° F. melt temperature. Subsequently, the coated carpet was cut by 39 inch long sections and taken to a post-molding operation. In the post-molding operation, the coated carpet was placed in a convection oven until the surface temperature of the carpet reached 300–370° F. (177–188° C.). The carpet was transferred to a press as soon as it reached the required surface temperature, and then compressed at room temperature for one to one and a half minutes. The precoating material was evaluated in terms of Taber abrasion and pull-out force, and the like. In order to be acceptable, the material should completely "wet" the carpet backing and meet the abrasion and adhesion requirements. The required quality properties included: 160–250 MFR @190° C., good flexibility as compared to low density polyethylene, fiber loss under Taber abrasion of <0.1 gram at 300 cycle, and maximum cycle to failure >2000 cycles, and fiber pull-out force of >10 N.

TABLE I

Characteristics of base PP materials employed

| | PP | | | sPP |
|---|---|---|---|---|
| Grade | A | B | C | D |
| Manufacturer | ACC[b] | ACC[b] | ACC[b] | Fina |
| % C$_2$ | 7 | 0 | 5.5 | <1.0 |
| MFR[c] @ 230° C. (grams/10 min.) | 2.0 | 1.1 | 120 | 0.5 |
| Flex modulus (kpsi) | 180 | 220 | 155 | — |

In the above Table I, ACC stands for Aristech Chemical Corporation, sPP stands for syndiotactic polypropylene, and MFR is the melt flow rate. Fina is used as abbreviation for Fina Oil and Chemical Company.

TABLE II

Characteristics of impact-modifiers employed

| Grade | Engage 8400 | DFDB 1085 | DFDB 9042 | LDPE | aPP[a] W120 |
|---|---|---|---|---|---|
| Manufacturer | Dupont-Dow | UCC[b] | UCC[b] | Dow | Huntsman |
| % C$_2$ | 75 | 75 | 75 | 100 | 0 |
| Density | 0.87 | 0.884 | | 0.918 | 0.88 |
| MFR[c] @230° C. (grams/10 min) | 77 | 2 | 10 | 560 | 575 |
| Tensile Strength (psi) | — | 1140 | 1340 | 1363 | 1100 |
| Flexural Modulus (kpsi) | — | 3.7 | 12.6 | 30 | — |
| Shore A | 72 | 77 | 93 | | |
| Shore D | — | 18 | 29 | 52 | 48 |

In the above table, aPP is used to represent atactic polypropylene, and UCC is used for Union Carbide Corporation. Other components include Trigonox 101 also known as 2,5-dimethyl-2,5 bis-(t-butyl peroxy)hexane, obtained from Elf Atochem. MP 880 is a Unite® product having 200 MFR and 0.7–0.8% MA (maleic anhydride) and is obtained from Uniroyal. MP 1000 is another Unite® product having 1000 MFR, and 1–1.5% MA, also obtained from Uniroyal.

The polymer compositions for the extruded sheet were prepared utilizing Werner-Pfleiderer ZSK-30 co-rotating twin screw extruder (L/D=44). The high MFR polypropylene material was obtained via controlled rheology by cracking the applicable polypropylene product in the presence of known additives. The controlled rheology additives are well known in the art. For example, Trigonox 101 as shown above, was utilized in a 1:1 mixture with heptane and fed with polypropylene polymer pellets into an extruder for mixing and breaking down of the polymer chain. The heptane was subsequently pulled off via vacuum towards the end of the extruder. Additionally, where applicable, the products were compounded with impact modifiers by pre-blending and passing through an extruder. These methods are well known in the art. Various controlled rheology additives can be utilized in this invention and are well known in the art. Additionally, impact modifiers are well known in the art.

In general, a coating material has to flow easily, i.e., high MFR, to coat an object with desirable characteristics. In order to obtain a final composition for the pre-coat material having the desired high melt flow rate (MFR at 230° C.), it was determined that the polypropylene starting material should have an MFR of two times or more the desired end product. High melt flow polypropylene products are available from various producers. Montell and Fina offer reactor grade polypropylene products having high MFR values, with some in excess of 1000. These products may be advantageously utilized since one would not have to use controlled rheology chemicals to break down lower MFR products. Additionally, controlled rheology can be utilized in order to prepare such high melt flow polypropylene products from lower melt flow products. Controlled rheology was conducted by adding peroxide into the polymer melt while extruding the polymer, where the melt temperature was kept at 203–205° C. (397–401° F.). In the various experiments conducted in this study, Trigonox 101 was utilized as the controlled rheology peroxide. It is well known in the art that the resultant high MFR is dependent on the type of starting polypropylene material, the type of peroxide added, and extrusion conditions. Accordingly, the amount of peroxide added to any starting material has to be adjusted depending on the other conditions in order to achieve the desired melt flow product.

U.S. Pat. No. 3,607,987 to Phillips Petroleum Company, issued on Sep. 21, 1971, U.S. Pat. No. 4,375,531, to Northern Petrochemical Company, issued Mar. 1, 1983, and U.S. Pat. No. 4,508,872, to Shell Oil Company, issued Apr. 2, 1985, are all references directed to controlled rheology methods. These references are incorporated herein for the purposes of the U.S. prosecution.

Additionally, syndiotactic polypropylene, available from Fina Oil and Chemical Company, was utilized as a blend to the other polypropylene products. Syndiotactic polypropylene exhibits properties of softness, flexibility, tackiness, and rate of crystallization that are desirable for this application. It was determined that the presence of syndiotactic polypropylene improves the performance of the composition of the present invention.

Various batches of products A, B, and A mixed with D, were extruded with Trigonox 101 in order to achieve higher MFR values. The solution mixture utilized was Trigonox 101:heptane at various ratios from 1:1 to 1:4. The results showed the following trends. MFR increases with increasing amounts of peroxide. The homopolymer tends to degrade more than the copolymer, and its blend with syndiotactic polypropylene at a given concentration of peroxide. Additionally, more peroxide is required to obtain a comparable MFR when 30% syndiotactic polypropylene is present or added to a base polypropylene composition. While not exactly clear on the reason for such, it was concluded that syndiotactic polypropylene is less degradable than isotactic polypropylene under the same conditions, or that syndiotactic polypropylene prevents degradation.

Since the potential carpet pre-coating materials should be soft and flexible like LDPE in addition to having high MFR, some impact-modifier was incorporated to modify the flexural modulus of the base material. The following four materials were prepared using 1000 MFR starting polypropylene materials.

TABLE III

Carpet Pre-coating Materials Formulated

| | 372-14-2 | 372-14-3 | 372-14-4 | 372-14-5 | LDPE |
|---|---|---|---|---|---|
| A | 50 | | 50 | | |
| B | | 50 | | 50 | |
| Engage 8400 | 50 | 50 | 40 | 40 | |
| Unite MP1000 | | | 10 | 10 | |
| MFR | 295 | 270 | 312 | 315 | 560 |
| Tensile Strength (psi) | 1260 | 1370 | 850 | 980 | 1363[a] |
| Elongation @ yield (%) | 23.6 | 15.4 | 25 | 19 | 109[a] |
| Flex Modulus (kpsi) | 40 | 43 | 21 | 29 | 30 |

[a]@ break

As can be seen from the results, melt flow rates for all the materials prepared were below 500 and ranged from 270 to 315. Tensile strength and flexural modulus are comparable to the target values. It was noted that the addition of Unite MP1000 improves the flexibility and maintains relatively high MFR of the compounds.

Since increasing melt temperature can increase flowability of the compound to some extent, MFR of the compounds was not too much of concern. The samples did not work well under the extrusion coating process. Overall, the melts of the compounded material did not flow homogeneously and thus, an acceptable sheet (20-mil thick) for coating could not be extruded. Furthermore, the compounds containing MP 1000 bubbled during extrusion because of the moisture in MP1000. When let down to 2% MP 1000 from 10% and dried, the bubbles were gone, but it was still difficult to extrude the material to an acceptable sheet. Factors that may be responsible for these results include too much impact modifier or too much difference in MFR between cracked material (1000 g/10 min) and the impact modifier (75 g/min), resulting in a phase separation in the melt. The quantity of impact modifier used is too high. The amount should not be greater than 40%. Due to the MFR difference and the quantity, the dispersion of the impact modifier is not easily achieved.

During the trial, the following additional quality limitations were introduced. The material should exhibit an acceptable sheet formation. The pre-coat should be completely "wet" with 20-mil thick sheet. The melt should be able to flow to penetrate between carpet fibers and the carpet backing, but should not go through the backing. The crystallization rate of the material is also critical. The melt should anchor the fibers with proper strength and flexibility. The post-molding process ensures that the melt captures the fibers.

Based on the results and observation made during the first set of experiments discussed above, the following materials were formulated for next trial, as given in Table IV. At this time, Engage 8400 that has 75 MFR was not available. An alternative impact modifier, UCC's Flexomer (DFDB 9042) having 9–10 MFR, was utilized. It is preferable to utilize an impact modifier with a higher MFR. A concern was that the introduction of lower MFR impact-modifier would make it difficult to maintain a high MFR of the final formulation. Furthermore, the phase separation between the base polymer and the impact modifier was expected to be worse. The amount of impact modifier has a greater effect on dispersion or phase separation than the difference in the MFR. Thus, in order to minimize the phase separation, a ternary blend system was introduced. Either syndiotactic PP, atactic PP or LDPE that has better compatibility to either the base PP or Flexomer® ($C_2$-$C_4$ copolymer) was employed as a third component. In addition, compounds that do not require any cracked material were formulated to reduce manufacturing cost.

As was given in Tables IV and V, the acceptable formulations contained syndiotactic polypropylene, indicating that sPP helped the adhesion by anchoring the fibers. The effect of the amount of sPP on abrasion and adhesion was assessed. Furthermore, since the controlled rheology is also an expensive process, use of un-cracked materials in the formulations is preferred if acceptable results are achieved. As given

TABLE IV

Carpet Pre-coating Materials Formulated

|  | 15-1 | 15-2 | 15-3 | 15-5 | 15-6 | 15-7 | LDPE |
|---|---|---|---|---|---|---|---|
| A |  |  | 50 |  |  | 45 |  |
| A and sPP | 70 | 65 |  |  |  |  |  |
| DFDB 9042 |  |  | 20 |  | 10 |  |  |
| DFDB 1085 | 30 | 30 |  |  |  | 20 |  |
| Dow LDPE |  |  | 30 |  |  | 30 | 100 |
| MP880 |  | 5 |  |  |  | 5 |  |
| Huntsman W120 |  |  |  | 40 | 40 |  |  |
| Ti4999G2 |  |  |  | 60 | 50 |  |  |
| MFR | 177 | 231 | 297 | 194 | 156 | 198 | 560 |
| Tensile Strength (psi) | 1290 | 1470 | 1600 | 2810 | 2340 | 1740 | 1363 |
| Elongation @ break (%) | 6.4 | 7.0 | 12 | 14.8 | 15.7 | 11.8 | 109 |
| Flex Modulus (kpsi) | 47 | 49 | 50 | 93 | 75 | 55 | 30 |

The results of the work depicted in Table IV are summarized as follows. When less than 20% impact-modifier was employed, tensile strength and flexural modulus were much higher than target.

The low elongation value at break was not of concern because the fiber pullout force is not dictated by elongation at break but by adhesion and tensile strength.

These materials were tested in automotive carpet applications. The melt temperature and the roll temperature were kept at 420–450° F. (216–232° C.) and 69° F. (21° C.), respectively. For some cases, the effect of higher roll temperature (125° F. vs. 69° F.) was assessed. At this time, all the materials produced "wet" coating to the backing and the abrasion and adhesion results are shown below. As given in Table VI, two materials e.g., 15-1 and 15-2, meet our requirement and the compound 15-1 exhibited significantly better abrasion property than the target (4000 vs. 2987 cycles). The results of 15-2 indicate that higher melt temperature and lower roll temperature provide better adhesion properties. The MFR range for the acceptable material was from 150–250.

Table VI, a lower amount of sPP (7 vs. 21%) was employed and compounds having much lower MFR, to avoid control rheology, were prepared for testing.

TABLE VI

Carpet Pre-coating Materials Formulated

|  | 17-4 | 17-5 | 17-6 | 17-7 | 17-8 | LDPE |
|---|---|---|---|---|---|---|
| A |  | 70 |  |  |  |  |
| A and sPP (90/10) | 70 |  |  |  |  |  |
| DFDB 1085 | 30 | 30 | 30 |  |  |  |
| Ti4999G2 |  |  | 40 | 50 | 50 |  |
| sPP |  |  | 10 | 10 | 20 |  |
| Huntsman W120 |  |  | 20 | 40 | 30 |  |
| MFR | 219 | 224 | 28 | 102 | 48 | 560 |
| Tensile Strength (psi) | 1611 | 1711 | 1717 | 2707 | 2626 | 1363 |
| Elongation @ break (%) | 7.6 | 5.4 | 18.6 | 17.9 | 19.6 | 109 |

TABLE V

Carpet Pre-coating Materials Tested

|  | 15-1 | 15-2 | 15-2 | 15-2 | 15-3 | 15-5 | 15-6 | 15-7 | LDPE |
|---|---|---|---|---|---|---|---|---|---|
| MFR | 177 | 231 | 231 | 231 | 297 | 194 | 156 | 198 | 560 |
| Melt Temp. | 450 | 420 | 450 | 450[a] | 450 | 450 | 450 | 450 | — |
| Fiber loss[b] | 0.037 | 0.217 | 0.057 | 0.107 | 0.1 | 0.275 | 0.142 | 0.052 | 0.035 |
| Max. cycle at failure | 4000 | 1850 | 2500 | 2325 | 1950 | 2175 | 2325 | 1875 | 2987 |
| Tuft bind hot (N) | 11.21 | 11.82 | 19.26 | 9.59 | 11.58 | 16.78 | 9.55 | 13.16 | 16.2 |

[a] roll temperature 125° F.
[b] @ 300 cycle (grams)

TABLE VI-continued

Carpet Pre-coating Materials Formulated

|  | 17-4 | 17-5 | 17-6 | 17-7 | 17-8 | LDPE |
|---|---|---|---|---|---|---|
| Flex Modulus (kpsi) | 54 | 63 | 52 | 89 | 84 | 30 |

The results are summarized as follows. The melt flow rates of all the materials prepared in the laboratory are significantly lower than that of the target. When un-cracked materials were employed, tensile strength and flexural modulus were much higher than LDPE. Elongation at break for the all the materials was significantly lower than that of LDPE. Tensile strength and flexural modulus increase with decreasing amounts of sPP.

The test results in automotive carpet manufacturing are given in Table VII. It was observed during the trial that the melts of the compounds 17-4 and 17-5 that contain 7 and 0% cracked sPP, respectively, appeared as "grainy" in contrast to "smooth" for 15-1 that has 21% sPP, suggesting phase separation in the melt. With 17-5 that does not contain sPP, pre-coating to the carpet backing was not successful at various melt temperatures. These experiments suggest that at least 10% of sPP is needed in the formulation.

TABLE VII

Carpet Pre-coating Materials Tested

|  | 17-4 | 17-4 | 17-5 | 17-6 | 17-7 | 17-8 | LDPE[a] |
|---|---|---|---|---|---|---|---|
| MFR | 219 | 219 | 224 | 28 | 102 | 48 | 417 |
| Melt temp. | 475 | 507 | varied | 490 | 465 | 465 | 461 |
| Fiber loss @ 300 cycle (grams) | 0.18 | 0.16 | — | 0.63 | 0.6 | 0.36 | 0.07 |
| Max. cycle at failure | 2000 | 2193 | — | 1437 | 1380 | 2037 | 3550 |
| Tuft bind hot (N) | 11.3 | 12.7 | — | 12.4 | 12.9 | 14.3 | 14.7 |

[a]Eastman LDPE 812

As given in Table VII, the results suggest that at least 10%, and preferably at least 20% cracked sPP may be necessary in pre-coating application.

From all of the above, it is concluded that formulations containing at least 10%, preferably at least 20% of syndiotactic polypropylene and some amount of a Flexomer® meet or exceed the specifications and outperform the incumbent material.

From the foregoing description, one of ordinary skill in the art can easily ascertain the essential characteristics of the instant invention, and without departing from the spirit and scope thereof, can make various changes and/or modifications of the disclosed techniques to adapt them to various usages and conditions. As such, these changes and/or modifications are properly within the range of equivalents of the following claims.

What is claimed is:

1. A carpet comprising
   (a) a primary backing,
   (b) tufts of carpet fibers protruding from a top surface of the primary backing, and
   (c) an extruded sheet of a homogenous thermoplastic polyolefin polymer composition integrally fused to a bottom surface of the primary backing,
wherein the homogenous thermoplastic polyolefin polymer composition comprises at least 10% by weight of a cracked syndiotactic polypropylene and wherein the homogenous thermoplastic polyolefin polymer composition has a melt flow rate of 160 or higher.

2. The carpet of claim 1 wherein the cracked syndiotactic polypropylene concentration is at least 20% by weight of the extruded sheet of homogenous thermoplastic polyolefin polymer.

3. The carpet of claim 1 wherein the homogenous thermoplastic polyolefin polymer composition comprises less than 40 percent by weight of an impact modifier.

4. The carpet of claim 1 wherein the primary backing, the carpet fibers, and the extruded sheet comprise polypropylene polymers.

5. The carpet of claim 1 wherein the carpet has a fiber loss under Taber abrasion of less than 0.1 grams at 300 cycle, and fiber pull-out force of greater than 10 N.

6. A carpet comprising
   (a) a primary backing,
   (b) tufts of carpet fibers protruding from a top surface of the primary backing, and
   (c) an extruded sheet of a homogenous thermoplastic polyolefin polymer composition integrally fused to a bottom surface of the primary backing,
wherein the homogenous thermoplastic polyolefin polymer composition comprises at least 10% by weight of a cracked syndiotactic polypropylene and has a melt flow rate of 160 or higher, and wherein the carpet has a fiber loss under Taber abrasion of less than 0.1 grams at 300 cycle, and fiber pull-out force of greater than 10 N.

7. The carpet of claim 6 wherein the cracked syndiotactic polypropylene concentration is at least 20% by weight of the extruded sheet of homogenous thermoplastic polyolefin polymer.

8. The carpet of claim 6 wherein the homogenous thermoplastic polyolefin polymer composition comprises less than 40 percent by weight of an impact modifier.

9. An automotive carpet comprising
   a) a primary backing made from a composition comprising a polyolefin polymer,
   (b) tufts of pre-colored fibers protruding from a top surface of the primary backing, and
   (c) an extruded sheet of a homogenous thermoplastic polyolefin polymer composition integrally fused to a bottom surface of the primary backing,
wherein the homogenous thermoplastic polyolefin polymer composition comprises at least 20% by weight of a cracked syndiotactic polypropylene and at least 40 percent by weight of an isotactic polypropylene and has a melt flow rate of 160 or higher.

10. The carpet of claim 9 wherein the carpet has a fiber loss under Taber abrasion of than 0.1 grams at 300 cycle, and fiber pull-out force of greater than 10 N.

11. A method for manufacturing carpet comprising tufting pre-colored fibers into a primary backing to form a griege having a top surface of protruding fibers and a back surface of looped fibers, extruding onto the back surface a sheet of homogenous thermoplastic polyolefin polymer composition under conditions to integrally fuse the sheet to the back surface of the griege and the looped fibers, wherein the homogenous thermoplastic polyolefin polymer composition comprises at least 10% by weight of a cracked syndiotactic polypropylene and at least 40 percent by weight of an isotactic polypropylene and has a melt flow rate of 160 or higher.

12. The method of claim 11 wherein the cracked syndiotactic polypropylene concentration is at least 20% by weight of the extruded sheet of homogenous thermoplastic polyolefin polymer.

13. The method of claim 11 wherein the homogenous thermoplastic polyolefin polymer composition comprises less than 40 percent by weight of an impact modifier.

14. The method of claim 11 wherein the primary backing, the fibers, and the extruded sheet comprise polypropylene polymers.

15. The method of claim 11 wherein the carpet has a fiber loss under Taber abrasion of less than 0.1 grams at 300 cycle, and fiber pull-out force of greater than 10 N.

* * * * *